United States Patent
Eo et al.

(10) Patent No.: US 9,212,726 B2
(45) Date of Patent: Dec. 15, 2015

(54) AUTOMATED MANUAL TRANSMISSION

(71) Applicant: Hyundai Motor Company, Seoul (KR)

(72) Inventors: Soon Ki Eo, Whasung-Si (KR); Dong Soo Lee, Whasung-Si (KR); Jong Yun Park, Whasung-Si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 26 days.

(21) Appl. No.: 13/663,944

(22) Filed: Oct. 30, 2012

(65) Prior Publication Data

US 2013/0263682 A1  Oct. 10, 2013

(30) Foreign Application Priority Data

Apr. 10, 2012 (KR) .................. 10-2012-0037142

(51) Int. Cl.
*F16H 3/08* (2006.01)
*F16H 3/00* (2006.01)

(52) U.S. Cl.
CPC ........ *F16H 3/006* (2013.01); *F16H 2200/0052* (2013.01); *Y10T 74/19233* (2015.01)

(58) Field of Classification Search
USPC .................................................. 74/330, 331
See application file for complete search history.

(56) References Cited

U.S. PATENT DOCUMENTS

| | | | |
|---|---|---|---|
| 1,844,239 A | 2/1932 | Boehme et al. | |
| 2,611,038 A | 9/1952 | Graham | |
| 2,835,134 A | 5/1958 | Perruca | |
| 3,010,330 A | 11/1961 | Perruca | |
| 4,099,683 A | 7/1978 | Stouffer et al. | |
| 4,226,135 A * | 10/1980 | Winter | 74/330 |
| 5,311,789 A * | 5/1994 | Henzler et al. | 74/331 |
| 5,613,401 A * | 3/1997 | Maurizio | 74/325 |
| 7,258,032 B2 * | 8/2007 | Kim | 74/330 |
| 7,513,851 B2 * | 4/2009 | Sieffert et al. | 477/176 |
| 8,042,418 B2 * | 10/2011 | Matsushita et al. | 74/330 |
| 8,220,352 B2 * | 7/2012 | Ross et al. | 74/330 |
| 8,360,919 B2 * | 1/2013 | Kraynev et al. | 475/207 |
| 8,696,505 B2 * | 4/2014 | Lee et al. | 475/5 |
| 2002/0033059 A1 | 3/2002 | Pels et al. | |
| 2011/0017015 A1 * | 1/2011 | Cimatti et al. | 74/665 R |
| 2011/0203409 A1 * | 8/2011 | Nishida et al. | 74/665 A |

FOREIGN PATENT DOCUMENTS

DE   42 34 629 A1   4/1993
EP   0 071 801 A1   2/1983
JP   63-163062 A    7/1988

(Continued)

OTHER PUBLICATIONS

Prof. Dr. Kim, Chae-Hwi, Automated manual transmission, Advanced automotive chassis, Sep. 1, 2009, pp. 87-94, vol. 1, GoldenBell.

*Primary Examiner* — Ha D Ho
(74) *Attorney, Agent, or Firm* — Morgan, Lewis & Bockius LLP (57) ABSTRACT

An automated manual transmission may include a first input shaft and a second input shaft disposed in parallel with each other to form a plurality of stages with a common output shaft, a first switching mechanism that directly transmits or cuts power provided from a flywheel of an engine to or from the first input shaft or the second input shaft, and a second switching mechanism that transmits or cuts power provided from the flywheel through the clutch to or from the first input shaft or the second input shaft.

15 Claims, 4 Drawing Sheets

(56) References Cited

FOREIGN PATENT DOCUMENTS

| | | |
|---|---|---|
| JP | 2003-106389 A | 4/2003 |
| JP | 2005-195115 A | 7/2005 |
| KR | 2003-0031896 A | 4/2003 |
| KR | 10-0951967 B1 | 12/2009 |
| KR | 10-2010-0042964 A | 4/2010 |
| KR | 10-2011-0001326 A | 1/2011 |
| KR | 10-2011-0021120 A | 3/2011 |

* cited by examiner

AUTOMATED MANUAL TRANSMISSION

CROSS-REFERENCE TO RELATED APPLICATION

The present application claims priority to Korean Patent Application No. 10-2012-0037142, filed on Apr. 10, 2012, the entire contents of which is incorporated herein for all purposes by this reference.

BACKGROUND OF THE INVENTION

1. Field of the Invention

The present disclosure relates to an automated manual transmission. More particularly, it relates to the configuration of an automated manual transmission which makes it possible to improve non-smooth shifting, such as pulling, when shifting.

2. Description of Related Art

The gears of automated manual transmissions are automatically changed by an actuator while a vehicle travels so that they can provide convenience similar to automatic transmissions and contribute to improving fuel efficiency of a vehicle with power transmission efficiency better than automatic transmissions.

However, for an automated manual transmission based on a synchro-mesh type of shifting mechanism, power is necessarily instantaneously cut even during shifting that is automatically performed by an actuator and as a result torque decreases while the power is cut and non-smooth shifting, as if a vehicle is pulled back, is generated.

The description provided above as a related art of the present invention is just for helping understanding the background of the present invention and should not be construed as being included in the related art known by those skilled in the art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an automated manual transmission that can improve the commercial value of a vehicle by preventing non-smooth shifting to achieve smooth and stable shifting response, by changing the path of power supplied to drive the vehicle in shifting to make shifting easy and preventing reduction of torque generated during shifting, with a relatively simple and compact configuration in spite of using a synchro-mesh type shifting mechanism.

In an aspect of the present invention, an automated manual transmission may include a first input shaft and a second input shaft disposed in parallel with each other to form a plurality of stages with a common output shaft, a first switching mechanism that directly transmits or cuts power provided from a flywheel of an engine to or from the first input shaft or the second input shaft, and a second switching mechanism that transmits or cuts power provided from the flywheel through the clutch to or from the first input shaft or the second input shaft.

The first switching mechanism may include a first driving shaft directly connected to the flywheel, a first free gear and a second free gear that are rotatably fitted on the first driving shaft and transmit a rotational force to the first input shaft and the second input shaft, respectively, and a first power control mechanism directly engaging the first driving shaft to the first free gear or the second free gear, or disengaging the first driving shaft from both of the first and second free gears and switching the first driving shaft into a neutral position.

The first power control mechanism is a synchro-mesh mechanism including a hub disposed at the first driving shaft to be prevented in rotation and a sleeve splined-engaged with the outside of the hub and directly engaging the hub to the first free gear or the second free gear, or disengaging the hub from both of the first free gear and the second free gear while axially reciprocating.

The second switching mechanism may include a second driving shaft selectively connected to the flywheel through the clutch, a third free gear and a fourth free gear that are rotatably fitted on the second driving shaft and transmit a rotational force to the first input shaft and the second input shaft, respectively, and a second power control mechanism directly engaging the second driving shaft to the third free gear or the fourth free gear, or disengaging the second driving shaft from both of the third free gear or the fourth free gear and switching the second driving shaft into a neutral position.

The second power control mechanism is a synchro-mesh mechanism including a hub disposed at the second driving shaft to be prevented in rotation and a sleeve spline-engaged with the outside of the hub and directly engaging the hub to the third free gear or the fourth free gear, or disengaging the hub from both of the third free gear or the fourth free gear while axially reciprocating.

The second driving shaft is a hollow shaft, the first driving shaft is connected to the synchro-mesh mechanism from the flywheel through the second driving shaft, a first driven gear tooth-engaged with the first free gear and a second driven gear tooth-engaged with the third free gear are fitted on the first input shaft, and a third driven gear tooth-engaged with the second free gear and a fourth driven gear tooth-engaged with the fourth free gear are fitted on the second input shaft.

The size and the gear ratio of the first free gear and the first driven gear are the same as the size and the gear ratio of the third free gear and the second driven gear while the size and the gear ratio of the second free gear and the third driven gear are the same as the size and the gear ratio of the fourth free gear and the fourth driven gear.

The first input shaft and the second input shaft are disposed to separately implement odd-numbered stages and even-numbered stages in the stages implemented together with the common output shaft.

An intermediate shaft is engaged with the output shaft in an external engagement gear-type and operates a differential.

In another aspect of the present invention, an automated manual transmission may include a first input shaft and a second input shaft disposed in parallel with each other, an output shaft engaged with the first input shaft and the second input shaft by a plurality of pairs of shifting gears, and a first switching mechanism and a second switching mechanism selectively transmitting power from an engine to the first input shaft and the second input shaft.

The first switching mechanism may include a first driving shaft directly connected to a flywheel of the engine, and the second switching mechanism may include a second driving shaft coaxially fitted around the first driving shaft and a clutch connecting or disconnecting the second driving shaft to or from the flywheel.

A first driven gear receiving a rotational force through the first switching mechanism and a second driven gear receiving a rotational force through the second switching mechanism are fitted on the first input shaft, a third driven gear receiving a rotational force through the first switching mechanism and a fourth driven gear receiving a rotational force through the second switching mechanism are fitted on the second input shaft, the first switching mechanism is engaged to the first driven gear and the third driven gear as an external engagement-gear to transmit power, and the second switching mechanism is engaged to the second driven gear and the fourth driven gear as an external engagement-gear to transmit power.

An intermediate shaft is engaged to the output shaft in an external engagement gear-type and operates a differential.

The first switching mechanism and the second switching mechanism may include a synchro-mesh mechanism.

The first power control mechanism may include a hub disposed at the first driving shaft to be prevented in rotation and a sleeve splined-engaged with the outside of the hub and directly engaging the hub to a first free gear or a second free gear that are rotatably fitted on the first driving shaft, or disengaging the hub from both of the first free gear and the second free gear while axially reciprocating.

The second power control mechanism may include a hub disposed at the second driving shaft to be prevented in rotation and a sleeve spline-engaged with the outside of the hub and directly engaging the hub to a third free gear or a fourth free gear that are rotatably fitted on the second driving shaft, or disengaging the hub from both of the third free gear or the fourth free gear while axially reciprocating.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
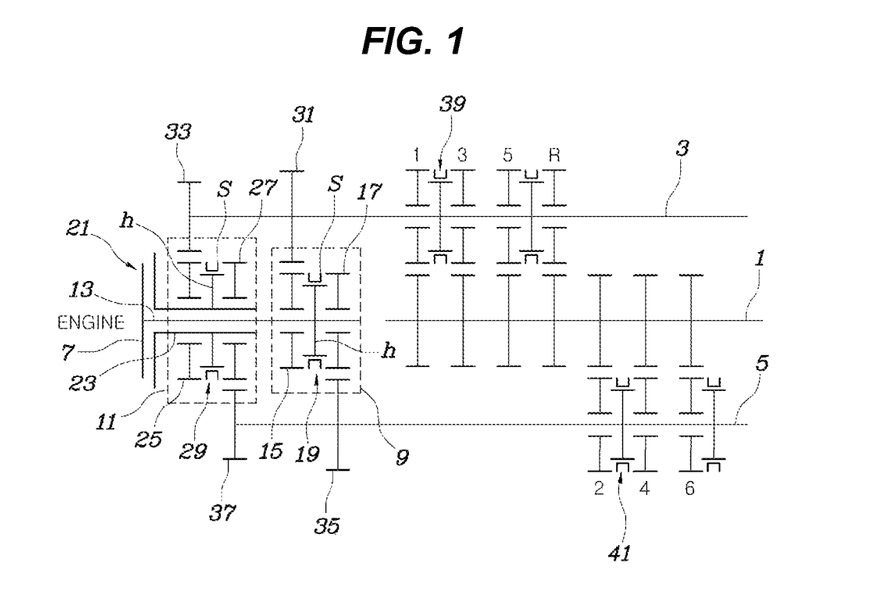
FIG. 1 is a view showing the structure of an automated manual transmission according to an exemplary embodiment of the present invention.

Referring to FIG. 1, an automated manual transmission according to an exemplary embodiment of the present invention includes: a first input shaft 3 and a second input shaft 5 disposed in parallel with each other to form a plurality of stages with a common output shaft 1, a first switching mechanism 9 that directly transmits or cuts power provided from a flywheel 7 of an engine to or from the first input shaft 3 or the second input shaft 5, and a second switching mechanism 11 that transmits or cuts power provided from the flywheel 7 through the clutch 21 to or from the first input shaft 3 or the second input shaft 5.

That is, the power from the engine can be selectively supplied to the first input shaft 3 and the second input shaft 5 by the first switching mechanism 9 and the second switching mechanism 11 so that it is possible to form a power flow through a path other than the path in which power is cut for shifting during shifting in addition to form power flow while a vehicle travels without shifting, and accordingly, it is possible to prevent reduction of torque during shifting.

It is preferable that the first input shaft 3 and the second input shaft 5 are disposed to separately implement odd-numbered stages and even-numbered stages in the stages implemented together with the output shaft 1. That is, this is because it is possible to perform the free selecting function of the DCT by sequentially shifting from a stage in any one of the two input shafts to the next stage by the other input shaft, similar to the DCT in the related art.

For reference, in the exemplary embodiment, the first, third, fifth, and R stages are connected to the first input shaft 3 and the second, fourth, and sixth stages are connected to the second input shaft 5.

In the exemplary embodiment, the first switching mechanism 9 includes: a first driving shaft 13 directly connected to the flywheel 7, a first free gear 15 and a second free gear 17 that are rotatably fitted on the first driving shaft 13 and transmit a rotational force to the first input shaft 3 and the second input shaft 5, respectively, and a first power control mechanism 19 directly connecting the first driving shaft 13 to the first free gear 15 or the second free gear 17, or disconnecting the first driving shaft 13 from both of them and switching it into a neutral position.

The first power control mechanism 19 may be a synchro-mesh mechanism including a hub h disposed at the first driving shaft 13 to be prevented in rotation and a sleeve s engaged with the outside of the hub h and directly connecting the hub h to the first free gear 15 or the second free gear 17, or disconnecting the hub from both of them while axially reciprocating.

Obviously, the synchro-mesh mechanism can also be used as a mechanism for the second power control mechanism, as described below, and further includes a synchronizer ring and a key.

The second switching mechanism 11 includes: a second driving shaft 23 connected to the flywheel 7 through the clutch 21, a third free gear 25 and a fourth free gear 27 that are rotatably fitted on the second driving shaft 23 and transmit a rotational force to the first input shaft 3 and the second input shaft 5, respectively, and a second power control mechanism 29 directly connecting the second driving shaft 23 to the third free gear 25 or the fourth free gear 27, or disconnecting the second driving shaft 23 from both of them and switching it into a neutral position.

The second power control mechanism 29 may be a synchro-mesh mechanism including a hub h disposed at the second driving shaft 23 to be prevented in rotation and a sleeve s spline-engaged with the outside of the hub h and directly connecting the hub h to the third free gear 25 or the fourth free gear 27, or disconnecting the hub from both of them while axially reciprocating.

Obviously, the first power control mechanism 19 and the second power control mechanism 29 may be replaced with various mechanisms such as a dry or wet friction clutch, a dog clutch, a friction band, a magnetic clutch, or a latch mechanism, other than the synchro-mesh mechanism.

In the exemplary embodiment, the second driving shaft 23 is a hollow shaft, the first driving shaft 13 is connected to the synchro-mesh mechanism from the flywheel 7 through the second driving shaft 23, a first driven gear 31 tooth-engaged with the first free gear 15 and a second driven gear 33 tooth-engaged with the third free gear 25 are fitted on the first input shaft 3, and a third driven gear 35 tooth-engaged with the second free gear 17 and a fourth driven gear 37 engaged with the fourth free gear 27 are fitted on the second input shaft 5.

As described above, the first driving shaft 13 is disposed coaxially with the second driving shaft 23 while the first switching mechanism 9 and the second switching mechanism 11 are disposed close to each other to make the transmission compact.

In the automated manual transmission having the configuration described above, since the first free gear 15 to the fourth free gear 27 transmit power in external engagement gear-type to the first driven gear 31 to the fourth driven gear 37, the first input shaft 3 and the second input shaft 5 rotate opposite to the rotational direction of the engine flywheel 7 and the output shaft 1 correspondingly rotates in the same direction as the flywheel 7, thereby providing a configuration optimized for an FR vehicle.

Figure 2:
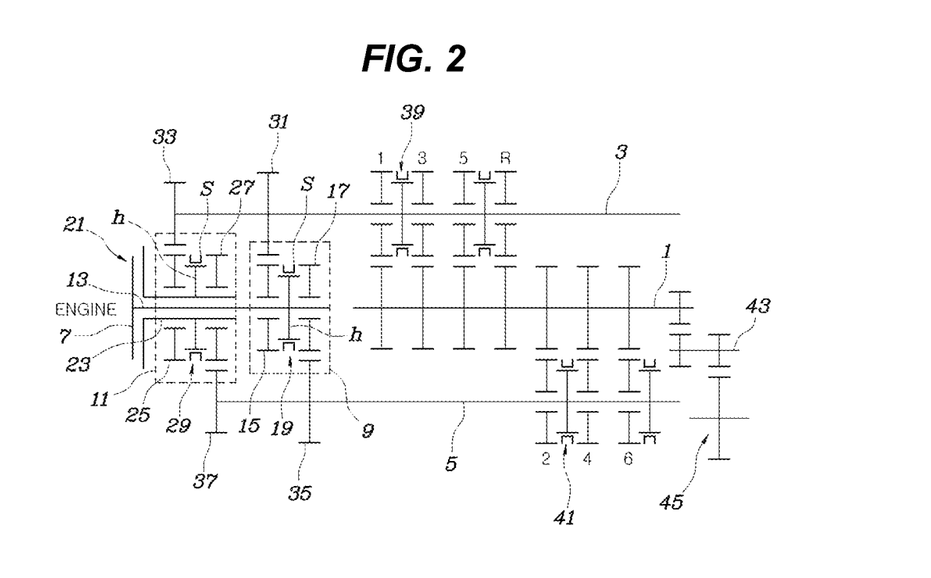
FIG. 2 is a view showing another embodiment of an automated manual transmission according to an exemplary embodiment of the present invention.

Obviously, the automated manual transmission of the present invention can also provide a configuration suitable for an FR vehicle with the engine transversely disposed, and as shown in FIG. 2, it is possible to provide a configuration optimized for a front wheel drive vehicles by further connecting an intermediate shaft 43 to the output shaft 1 in an external engagement gear-type to force the intermediate shaft to operate a differential 45.

On the other hand, it is preferable that the size and the gear ratio of the first free gear 15 and the first driven gear 31 are the same as the size and the gear ratio of the third free gear 25 and the second driven gear 33 while the size and the gear ratio of the second free gear 17 and the third driven gear 35 are the same as the size and the gear ratio of the fourth free gear 27 and the fourth driven gear 37.

Shifting according to an exemplary embodiment of the present invention, as configured-above, is described hereafter with reference to FIGS. 3 to 7.

Figure 3:
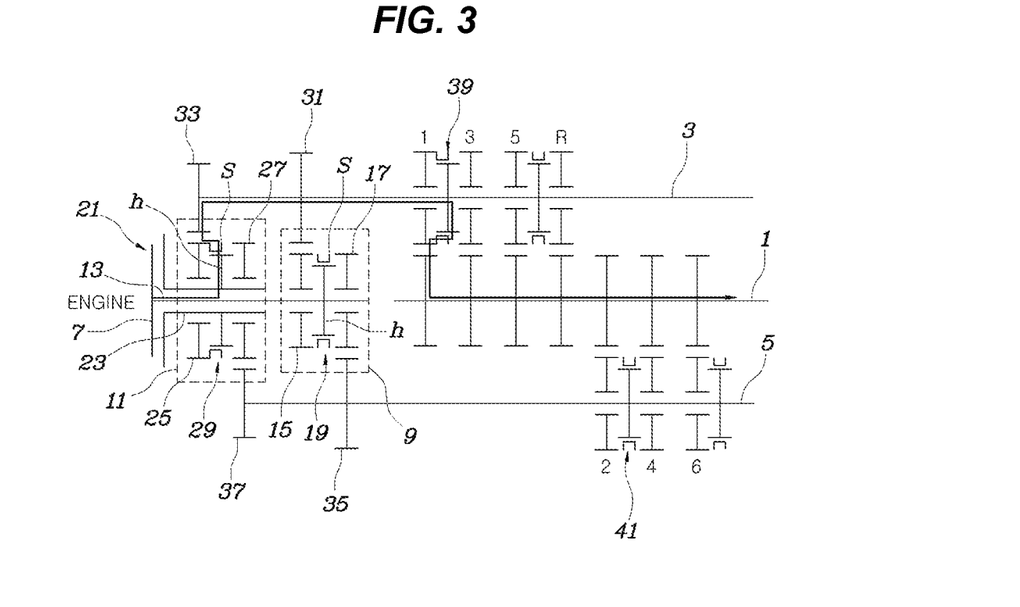
FIGS. 3 to 7 are views illustrating a series of processes of shifting in the structure of FIG. 1.

FIG. 3 is a view showing power transmission during driving in the first gear, in which the clutch 21 is engaged with the flywheel 7 to drive the second driving shaft 23, the second power control mechanism 29 of the second switching mechanism 11 is connected to the third free gear 25 by the sleeve s, the power from the second driving shaft 23 operates the first input shaft 3 through the third free gear 25 and the second driven gear 33, and a first-third stage synchro-mesh mechanism 39 connects the first shifting gear to the first input shaft 3 so that the rotation force from the first input shaft 3 is transmitted to the output shaft 1 with the first transmission gear ratio through the first shifting gear.

When shifting is performed to the second stage in the state described above, as shown in FIG. 4, in the first power control mechanism 19 of the first switching mechanism 9, the sleeve s connects the first free gear 15 to the first driving shaft 13 and the power from the engine is supplied to the first driven gear 31 through the first driving shaft 13 and the first free gear 15 so that power is supplied to the first input shaft 3 through both the first driven gear 31 and the second driven gear 33.

Figure 4:
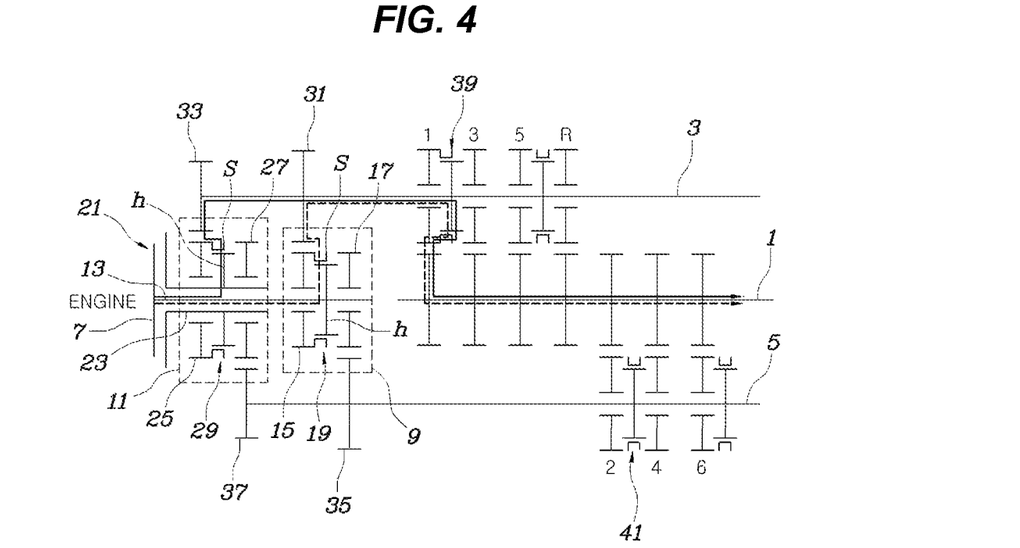

Since the size and the gear ratio of the first free gear 15 and the first driven gear 31 are the same as the size and the gear ratio of the third free gear 25 and the second driven gear 33, the sleeve s of the first power control mechanism 19 is easily connected.

When the clutch 21 is disengaged in the state described above, as shown in FIG. 5, power is not supplied any more to the second driving shaft 23 so that power is not supplied to the first input shaft, but the first driving shaft 13 transmits power to the first input shaft 3 through the first free gear 15 and the first driven gear 31 while keeping operating with the flywheel 7 so that the first input shaft 3 and the output shaft 1 keep implementing the first stage and power keeps transmitted to the output shaft 1.

Figure 5:
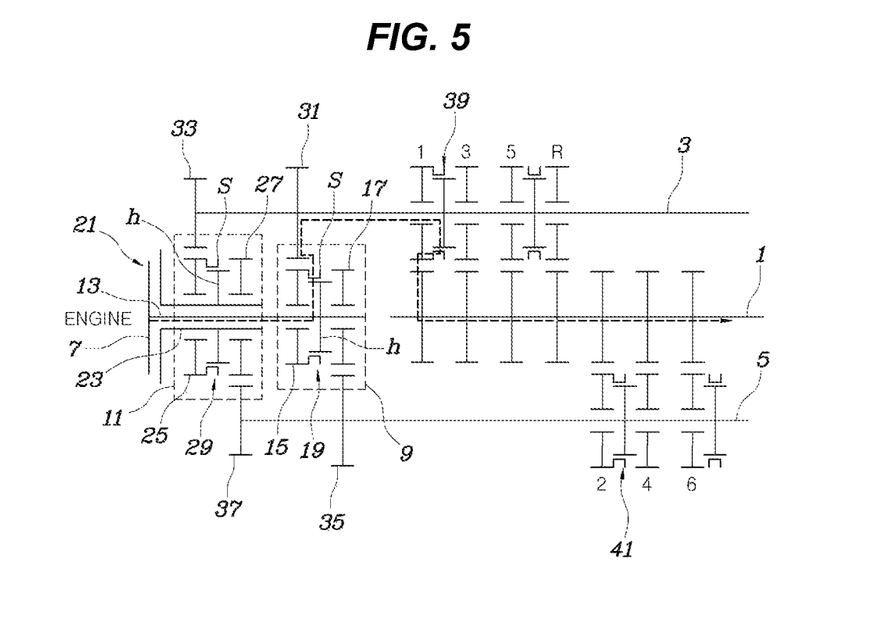

Further, since power is not supplied to the second input shaft 5 through the first driving shaft 13 or the second driving shaft 23, the sleeve s of a second-fourth synchro-mesh mechanism 41 directly connects the second shifting gear to the second input shaft 5 to shift to the second stage.

Figure 6:
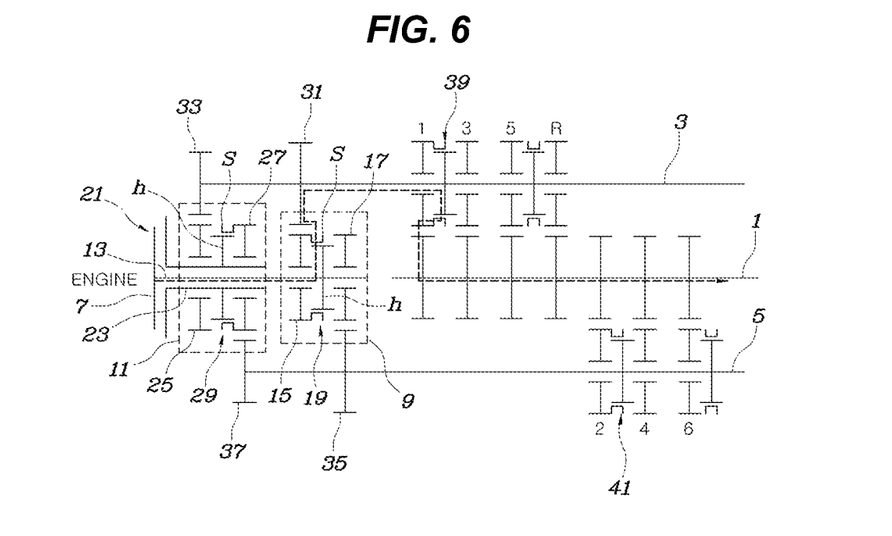

FIG. 6 shows a process of preparing to transmit power for the second stage by connecting the fourth free gear 27 to the second driving shaft 23 through the sleeve s of the second switching mechanism 11.

Figure 7:
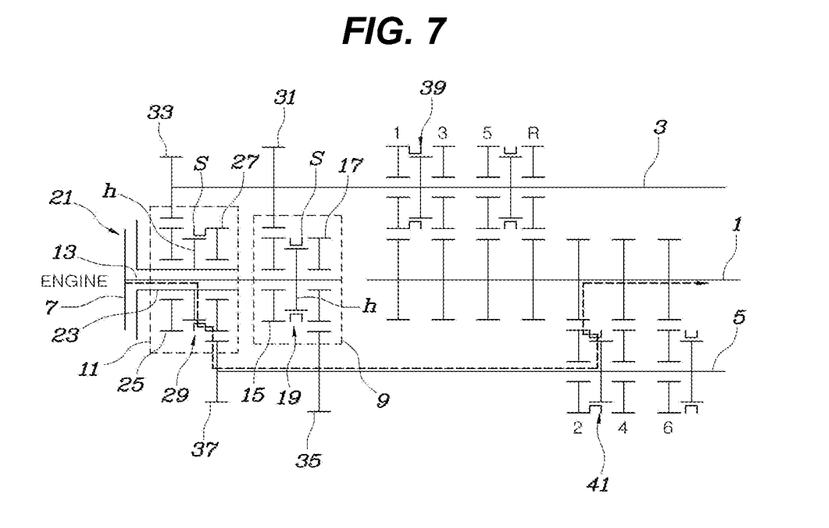

As shown in FIG. 7, the power to the first input shaft 3 is cut by disconnecting the sleeve s from the first switching mechanism 9 and switching it into the neutral state, the rotational force from the flywheel 7 is transmitted to the second input shaft 5 through the second driving shaft 23, the fourth free gear 27, and the fourth driven gear 37 by engaging the clutch 21, and the rotational force from the second input shaft 5 is outputted to the output shaft 1 through the second-fourth synchro-mesh mechanism 41 and the second shifting gear while implementing the second stage.

Therefore, power can be supplied continuously to the output shaft 1 during shifting from the first stage to the second stage so that the reduction of torque of the output shaft 1 is decreased during shifting.

In practice, the operation time of the first-third synchro-mesh mechanism 39 or the second-fourth synchro-mesh mechanism 41 during the shifting is not limited to the above description and they may operate in advance or later within a possible range to perform, for example, the pre-selecting function.

The shifting to the other stages is performed in almost the same way and the description is not provided.

The present invention provides an automated manual transmission that can improve the commercial value of a vehicle by preventing non-smooth shifting to achieve smooth and stable shifting response, by changing the path of power supplied to drive the vehicle in shifting to make shifting easy and preventing reduction of torque generated during shifting, with a relatively simple and compact configuration in spite of using a For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An automated manual transmission comprising:
   a first input shaft and a second input shaft disposed in parallel with each other to form a plurality of stages with a common output shaft;
   a first switching mechanism that directly transmits or cuts power provided from a flywheel of an engine to or from the first input shaft or the second input shaft; and
   a second switching mechanism that transmits or cuts power provided from the flywheel through a clutch to or from the first input shaft or the second input shaft,
   wherein the first switch mechanism includes a first driving shaft directly connected to the flywheel and the second switching mechanism includes a second driving shaft coaxially positioned with the first driving shaft and directly connected to the clutch.

2. The automated manual transmission of claim 1, wherein the first switching mechanism further includes:
   a first free gear and a second free gear that are rotatably fitted on the first driving shaft and transmit a rotational force to the first input shaft and the second input shaft, respectively; and
   a first power control mechanism directly engaging the first driving shaft to the first free gear or the second free gear, or disengaging the first driving shaft from both of the first and second free gears and switching the first driving shaft into a neutral position.

3. The automated manual transmission of claim 2, wherein the first power control mechanism is a synchro-mesh mechanism including a hub disposed at the first driving shaft to be prevented in rotation and a sleeve splined-engaged with an outside of the hub and directly engaging the hub to the first free gear or the second free gear, or disengaging the hub from both of the first free gear and the second free gear while axially reciprocating.

4. The automated manual transmission of claim 2, wherein the second switching mechanism further includes:
   a third free gear and a fourth free gear that are rotatably fitted on the second driving shaft and transmit a rotational force to the first input shaft and the second input shaft, respectively; and
   a second power control mechanism directly engaging the second driving shaft to the third free gear or the fourth free gear, or disengaging the second driving shaft from both of the third free gear or the fourth free gear and switching the second driving shaft into a neutral position.

5. The automated manual transmission of claim 4, wherein the second power control mechanism is a synchro-mesh mechanism including a hub disposed at the second driving shaft to be prevented in rotation and a sleeve spline-engaged with an outside of the hub and directly engaging the hub to the third free gear or the fourth free gear, or disengaging the hub from both of the third free gear or the fourth free gear while axially reciprocating.

6. The automated manual transmission of claim 4, wherein the second driving shaft is a hollow shaft, the first driving shaft is connected to the synchro-mesh mechanism from the flywheel through the second driving shaft, a first driven gear tooth-engaged with the first free gear and a second driven gear tooth-engaged with the third free gear are fitted on the first input shaft, and a third driven gear tooth-engaged with the second free gear and a fourth driven gear tooth-engaged with the fourth free gear are fitted on the second input shaft.

7. The automated manual transmission of claim 6, wherein a size and the gear ratio of the first free gear and the first driven gear are a same as a size and the gear ratio of the third free gear and the second driven gear while a size and the gear ratio of the second free gear and the third driven gear are the same as a size and the gear ratio of the fourth free gear and the fourth driven gear.

8. The automated manual transmission of claim 1, wherein the first input shaft and the second input shaft are disposed to separately implement odd-numbered stages and even-numbered stages in the stages implemented together with the common output shaft.

9. The automated manual transmission of claim 1, wherein an intermediate shaft is engaged with the output shaft in an external engagement gear-type and operates a differential.

10. An automated manual transmission comprising:
    a first input shaft and a second input shaft disposed in parallel with each other;
    an output shaft engaged with the first input shaft and the second input shaft by a plurality of pairs of shifting gears; and
    a first switching mechanism and a second switching mechanism selectively transmitting power from an engine to the first input shaft and the second input shaft,
    wherein the first switch mechanism includes a first driving shaft directly connected to a flywheel of the engine, and
    the second switching mechanism includes a second driving shaft coaxially fitted around the first driving shaft and a clutch connecting or disconnecting the second driving shaft to or from the flywheel.

11. The automated manual transmission of claim 10, wherein a first driven gear receiving a rotational force through the first switching mechanism and a second driven gear receiving a rotational force through the second switching mechanism are fitted on the first input shaft,
    a third driven gear receiving a rotational force through the first switching mechanism and a fourth driven gear receiving a rotational force through the second switching mechanism are fitted on the second input shaft,
    the first switching mechanism is engaged to the first driven gear and the third driven gear as an external engagement-gear to transmit power, and
    the second switching mechanism is engaged to the second driven gear and the fourth driven gear as an external engagement-gear to transmit power.

12. The automated manual transmission of claim 11, wherein an intermediate shaft is engaged to the output shaft in an external engagement gear-type and operates a differential.

13. The automated manual transmission of claim 10, wherein the first switching mechanism and the second switching mechanism include a synchro-mesh mechanism.

14. The automated manual transmission of claim 10, wherein the first power control mechanism includes a hub disposed at the first driving shaft to be prevented in rotation and a sleeve splined-engaged with an outside of the hub and directly engaging the hub to a first free gear or a second free gear that are rotatably fitted on the first driving shaft, or disengaging the hub from both of the first free gear and the second free gear while axially reciprocating.

15. The automated manual transmission of claim 10, wherein the second power control mechanism includes a hub disposed at the second driving shaft to be prevented in rotation and a sleeve spline-engaged with an outside of the hub and directly engaging the hub to a third free gear or a fourth free gear that are rotatably fitted on the second driving shaft, or disengaging the hub from both of the third free gear or the fourth free gear while axially reciprocating.

* * * * *